ary Examiner—Glennon H. Hollrah
Attorney, Agent, or Firm—Harry Falber

United States Patent
Wilcox

[19]

[11] 3,869,278
[45] Mar. 4, 1975

[54] HYDROXYLAMINES AND DERIVATIVES THEREOF AS ABSCISSION AGENTS

[76] Inventor: Merrill Wilcox, 2911 N.W. 30th Ter., Gainesville, Fla. 32601

[22] Filed: Jan. 24, 1974

[21] Appl. No.: 436,312

Related U.S. Application Data

[63] Continuation-in-part of Ser. No. 275,657, July 27, 1972, abandoned.

[52] U.S. Cl. ............. 71/121, 71/103, 260/583 DD
[51] Int. Cl. ..................................................... A01n
[58] Field of Search ..................................... 71/121

[56] References Cited
UNITED STATES PATENTS
3,410,676  11/1968  Hill ..................................... 71/121

OTHER PUBLICATIONS
Badische Anilin, "Organic Hydroxylamine Compounds" (1957) CA 54, p. 584 (1960).

Primary Examiner—Glennon H. Hollrah
Attorney, Agent, or Firm—Harry Falber

[57] ABSTRACT

A method of aiding in harvesting fruit wherein abscission is induced by application to the fruit bearing plant an effective amount of a compound of the formula

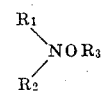

wherein $R_1$ and $R_2$ are independently hydrogen and substituted or unsubstituted alkyl, and $R_3$ is hydrogen, substituted or unsubstituted alkyl, alkylcarbonyl, N-alkylcarbamoyl, N,N-dialkylcarbamoyl, phenyl carbonyl and phenyl carbamoyl; as well as salts thereof.

7 Claims, No Drawings

HYDROXYLAMINES AND DERIVATIVES THEREOF AS ABSCISSION AGENTS

RELATED APPLICATION

This application is a continuation-in-part of copending application Ser. No. 275,657, filed July 27, 1972, now abandoned.

BACKGROUND OF THE INVENTION

The ability of plants to slough off organs by an active separation of cells is distinctive to higher green plants. Plant physiologists describe this process as abscission.

As our agricultural production has become more intensified, the use of mechanical harvesters has become more and more important in agricultural production. Their use helps to keep the unit cost of production down to a reasonable level. Where hand labor is still used in harvesting crops, any practice that can help to increase the productivity of a man per unit of time, would be an important agricultural contribution.

This invention relates to the use of certain chemicals which have a positive and beneficial effect on the abscission process. They facilitate and make the harvesting of crops easier. This is a new and unique discovery and is highly important in the agricultural sector. To harvest fruit, as given in the examples above, whether it is done by hand or mechanically, a given amount of force (energy) must be applied by hand or mechanically to the fruit, or portion of the plant to be harvested, in order to force it to abscise, or come loose from the rest of the plant. It is recognized that when a great deal of force must be applied during the harvesting operation: (1) the amount of fruit harvested in a given time is reduced as compared with fruit which is more easily loosened and taken from the plant, (2) the fruit may be damaged or reduced in quality grade because of the amount of force which must be applied, (3) some fruit becomes unmarketable because of excessive damage to the fruit, and (4) the plant itself may be damaged and in the case of perennial plants such as vines or trees, this is highly undesirable; also, in the case of annual plants where multiple harvests are to be made, damage at the first or earlier pickings is undesirable and should be avoided.

Chemicals used to assist in loosening the fruit for the harvesting operation are sometimes called, in general terms, harvesting aid chemicals or fruit loosening chemicals. If the amount of force needed to separate a fruit from the rest of the plant can be reduced through the use of a chemical, this would be a significant contribution to agriculture and would be useful to farmers and growers. Such a chemical would allow pickers to pick the fruit easily and more quickly. In the case where mechanical harvesters are used, the amount of force which would have to be applied by the mechanical harvester could be reduced. More fruit per tree (per vine, or unit or row) could be harvested more easily and uniformly. Less damage to the fruit itself and to the rest of the plant would result if a chemical loosening agent effectively reduced the required harvest force. The quality of the fruit would increase because of less damage and possibly the yield per tree (per acre, or per unit of measure) would increase because of a more uniform and complete harvest. The compounds of this invention do help to loosen the fruit which is to be harvested while at the same time, they do not significantly damage the rest of the plant.

SUMMARY OF THE INVENTION

In accordance with the present invention, there is provided an improved method for inducing abscission in fruit bearing plants by application to said plant a compound of the formula:

wherein $R_1$ and $R_2$ are independently hydrogen and substituted or unsubstituted $C_1$–$C_6$ alkyl, and $R_3$ is hydrogen, substituted or unsubstituted $C_1$–$C_6$ alkyl, alkylcarbonyl, N-alkylcarbamoyl, N,N-dialkylcarbamoyl, phenylcarbonyl and phenylcarbamoyl, the alkyl substitution in these groups containing from 1–6 carbon atoms. Acid and metal salts are also useful.

DETAILS OF THE INVENTION

Abscission agents useful in the present invention are compounds of the formula

wherein $R_1$, $R_2$ and $R_3$ are as hereinbefore defined.

Preferred abscission agents for use in the present invention are compounds of the formula

wherein $R_1$ and $R_2$ are H or $C_1$–$C_6$ alkyl and $R_3$ is H, $C_1$–$C_6$ alkyl or alkylcarbamoyl with $C_1$–$C_6$ alkyl groups. Salts which are useful in this invention include, for example, acid salts such as hydrohalides and sulfates, as well as alkali metal and alkaline-earth metal salts.

Particular compounds within the scope of the present invention include, for example, N,N-diethyl-0-(2-chloroethylcarbamyl)hydroxylamine, N,N-diethyl-0-(2-chloroethylcarbonyl)hydroxylamine, N,N-diethylhydroxylamine, hydroxylamine hydrochloride, and N-methyl-0-methyl-hydroxylamine. Particularly preferred compounds include N,N-diethylhydroxylamine and N,N-diethyl-0-(2-chloroethylcarbamyl)hydroxylamine.

The compounds useful as the abscission agents of the present invention are well known and are prepared in accordance with conventional techniques. Typical preparation procedures include, for example, the reaction of acetaldehyde and nitric acid and the reaction of the resulting glyoxal with hydroxylamine, the electrolysis of nitric acid. See also, Beilstein, Volume 1, page 761 and supplements.

The abscission agents of the present invention are applied to the plants to be treated in a variety of conventional ways. Typical application methods include for example, spraying aqueous solutions of said compounds.

The abscission agents of the present invention may be used alone or as mixtures and of course may be blended with conventional agricultural carriers, additives and adjuvants. The active ingredient or abscission agent of the present invention is conveniently employed in a variety of formulations such as those employing conventional adjuvants and carriers well known for use in similar agricultural applications. In choosing convenient application methods, it should be kept in mind, as is well known to those of skill in the art, that the choice of formulation and method of application may effect the degree of activity of a particular active ingredient.

The abscission agents of the present invention can, for example, be formulated as aqueous and non-aqueous solutions and dispersions, emulsifiable concentrates, dusts or wettable powders. Such formulation can contain from about 2% by weight to about 95% by weight, preferably from about 80% by weight to about 90% by weight of active abscission agent.

These various types of formulations can be prepared in accordance with procedures well known in the field of agricultural chemistry. General procedures useful, in accordance with this invention, for preparing various types of agricultural formulations such as wettable powders, emulsifiable concentrates, etc., are described in U.S. Pat. No. 3,410,676 to Hill.

Preferred formulations useful, in accordance with the present invention, include: aqueous solutions containing about 0.1% –1.0% of a non-ionic wetting agent.

The abscission agents of this invention or formulations thereof are conveniently applied at a rate such that about ¾ lbs. to about 16 lbs., preferably about 1 lb. to about 4 lbs., of abscission agent is applied per acre of plants to be treated.

The stage of growth of the plants to be treated is an important factor in the activity of the abscission agent. It is preferable, in accordance with the present invention, to apply the abscission agent when fruit are passing commercially acceptable maturity tests.

The abscission agents of the present invention are useful with a wide variety of fruit bearing crops and are particularly useful for inducing abscission in citrus plants. Typical crops with which the abscission agents of the present invention are useful include, for example, oranges, lemons, grapefruit, limes, olives, cherries and apples.

The abscission agents of the present invention are particularly desirable in comparison to known abscission agents in that they are not phytotoxic and are highly water-soluble.

EXAMPLE 1

A hydroxylamine was dissolved in water containing 0.5% Triton X–114 surfactant (a non-ionic surfactant manufactured by Rohm & Haas), at a concentration of 4,000 parts per million and sprayed to run-off on ten Hamlin oranges. Seven days later, the average pull force required to pick the oranges was measured:

| | Pull Force, lbs. | |
|---|---|---|
| | Treated | Carrier-Treated Control |
| N,N-diethyl-O-(2-chloroethylcarbamyl)hydroxylamine | 9.3 | 22.2 |

The following data was obtained in the same manner from pineapple oranges:

| | | |
|---|---|---|
| N,N-diethylhydroxylamine | 0.7 | 19.6 |
| hydroxylamine hydrochloride | 5.0 | 19.6 |

Comparable results can be achieved with other hydroxylamines falling within the scope of the prescribed generic formulae.

I claim:

1. A method of aiding in the harvesting of fruit wherein abscission is included, which method comprises applying to the fruit bearing plant an effective amount of a compound of the formula:

wherein $R_1$ and $R_2$ represent independently hydrogen, $C_1$ –$C_6$ alkyl radicals; and $R_3$ represents hydrogen, $C_1$ –$C_6$ alkyl, alkylcarbonyl, N-alkylcarbamoyl, N,N-dialkylcarbamoyl, phenylcarbonyl or phenylcarbamoyl; the alkyl substitution on the $R_3$ groups containing from 1–6 carbon atoms; or the acid, alkali and alkaline-earth metal salts thereof.

2. The method of claim 1 in which the compound is of the formula:

wherein $R_1$ and $R_3$ represent H or $C_1$ –$C_6$ alkyl, and where $R_3$ represents H, $C_1$ –$C_6$ alkyl, or N-alkylcarbamoyl having 1–6 carbon atoms in the alkyl group thereof.

3. The method of claim 1 in which said salt is selected from hydrohalide, sulfate, alkali metal or alkaline-earth metals salts of said compound.

4. The method of claim 2 in which the compound is N,N-diethyl-0-(2-chloroethylcarbamyl)hydroxylamine.

5. The method of claim 2 in which the compound is N,N-diethylhydroxylamine.

6. The method of claim 2 in which the compound is hydroxylamine hydrochloride.

7. The method of claim 2 wherein the fruit is a citrus fruit.

* * * * *